United States Patent [19]

Danner et al.

[11] Patent Number: 5,011,218
[45] Date of Patent: Apr. 30, 1991

[54] HEADLINER

[75] Inventors: Edward L. Danner, Warren; Alan D. Picken, Pontiac, both of Mich.

[73] Assignee: Van Dresser Corporation, Troy, Mich.

[21] Appl. No.: 297,492

[22] Filed: Jan. 17, 1989

[51] Int. Cl.$^5$ ............................................. B60J 7/00
[52] U.S. Cl. .................................... 296/214; 296/97.9
[58] Field of Search ............................... 296/214, 97.9

[56] References Cited

U.S. PATENT DOCUMENTS

| | | | |
|---|---|---|---|
| 4,149,749 | 4/1979 | Canal | 296/214 |
| 4,172,918 | 10/1979 | Doerer | 296/214 |
| 4,352,522 | 10/1982 | Miller | 296/214 |
| 4,610,478 | 9/1986 | Tervol | 296/214 |
| 4,893,866 | 1/1990 | Dowd et al. | 296/214 |

Primary Examiner—Robert R. Song
Attorney, Agent, or Firm—Barnes, Kisselle, Raisch, Choate, Whittemore & Hulbert

[57] ABSTRACT

A headliner and retainer bar assembly adapted to be installed in the roof of a vehicle, comprising a headliner panel, a retainer bar extending along the front edge portion of the panel on the top side of the panel next to the roof of the vehicle, and accessory components including sun visors on the bottom, finish side of the panel. The accessory components are secured to the retainer bar by fasteners which extend through the headliner panel to provide a sandwich assembly capable of being installed as a unit. Fasteners, preferably of the type which are installed by being pushed into the designated attaching holes and then strongly resist being pulled back out, secure the retainer bar to the roof frame structure of the vehicle.

9 Claims, 2 Drawing Sheets

HEADLINER

This invention relates generally to automotive liner panels and refers more particularly to an automotive headliner and retainer assembly.

BACKGROUND AND SUMMARY OF THE INVENTION

At the present time, automotive liner panels such as headliners are secured in the vehicle by means of clips, adhesive, moldings and the like which attach the panel directly to the frame or roof structure of the vehicle.

In accordance with the present invention, a liner and retainer assembly is provided which comprises a liner panel, a retainer on the back side of the panel which normally faces the frame structure of the vehicle, and one or more accessory components such as a sunshade or the like, on the exposed, finish side of the panel. The accessory components are secured to the retainer by conventional fasteners such as screws, clips, etc. extending through the panel. The panel, retainer and accessory component or components provide a sandwich assembly which is capable of being installed as a unit in the vehicle. The retainer is secured to the frame structure of the vehicle by fasteners preferably of the push button type, such as Christmas tree fasteners, which resist withdrawal after having been inserted in a hole.

More particularly, the retainer is a bar which extends along one edge portion of the liner panel.

Additional components may also be secured to the liner panel. In the case of a headliner, an assist strap is one such additional component. The assist strap may be applied to the finish side of the headliner and secured to a separate retainer on the back side of the headliner by fastener means extending through the headliner.

It is a general object of this invention to provide a liner and retainer assembly having the characteristics described above and which is an improvement over the liner panel systems disclosed in the following U. S. Pat. Nos:

| | |
|---|---|
| 3,635,519 | Foster, et al |
| 3,876,246 | Lutz |
| 4,352,522 | Miller |
| 4,423,902 | Yaotani, et al |
| 4,461,509 | Yaotani, et al |
| 4,610,478 | Tervol |
| 4,728,383 | Kaller, et al |

These and other objects of the invention will become more apparent as the following description proceeds, especially when considered with the accompanying drawings.

DETAILED DESCRIPTION

Figure 1:
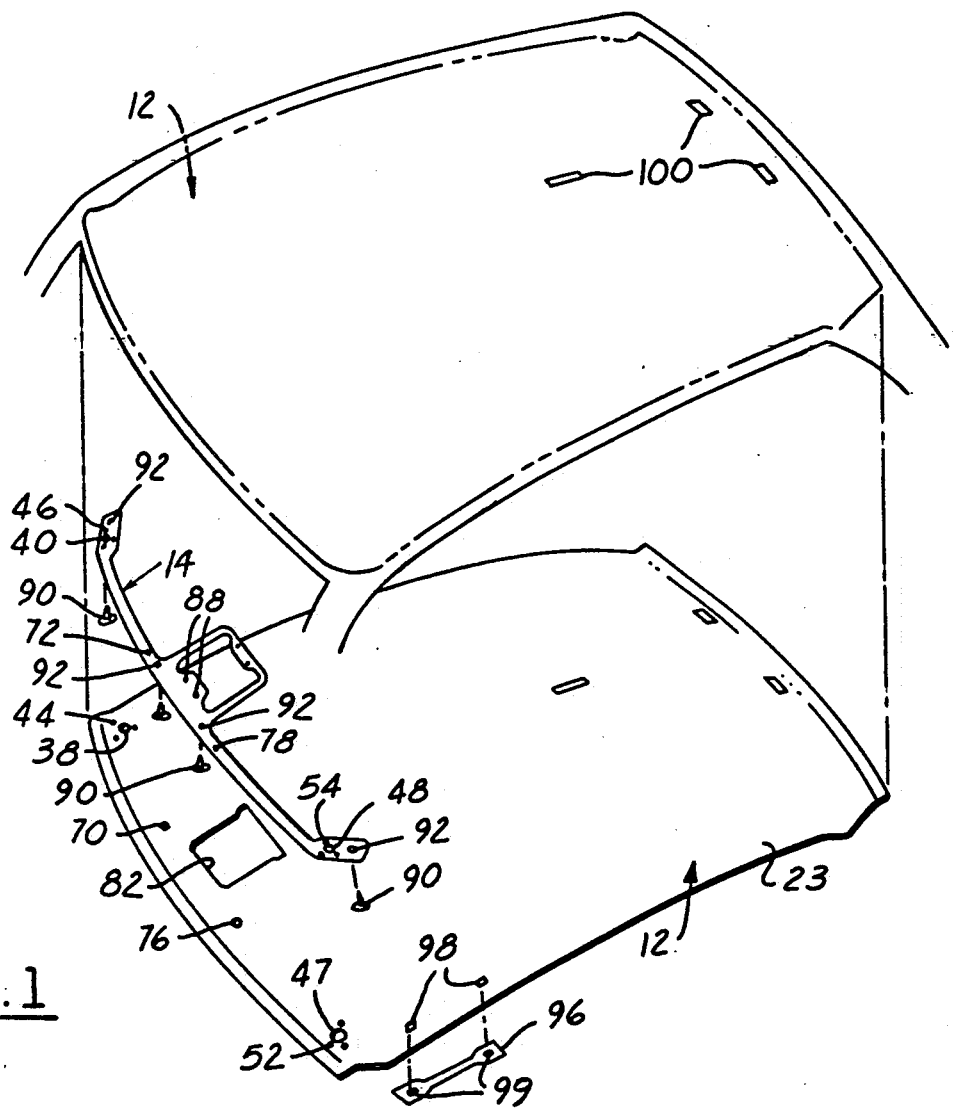
FIG. 1 is an exploded view in perspective of a headliner and retainer bar assembly constructed in accordance with this invention. The side of the headliner and of the retainer bar which face the roof of the vehicle when installed are shown in solid lines. The outline of the installed headliner is shown in phantom lines.
Figure 2:
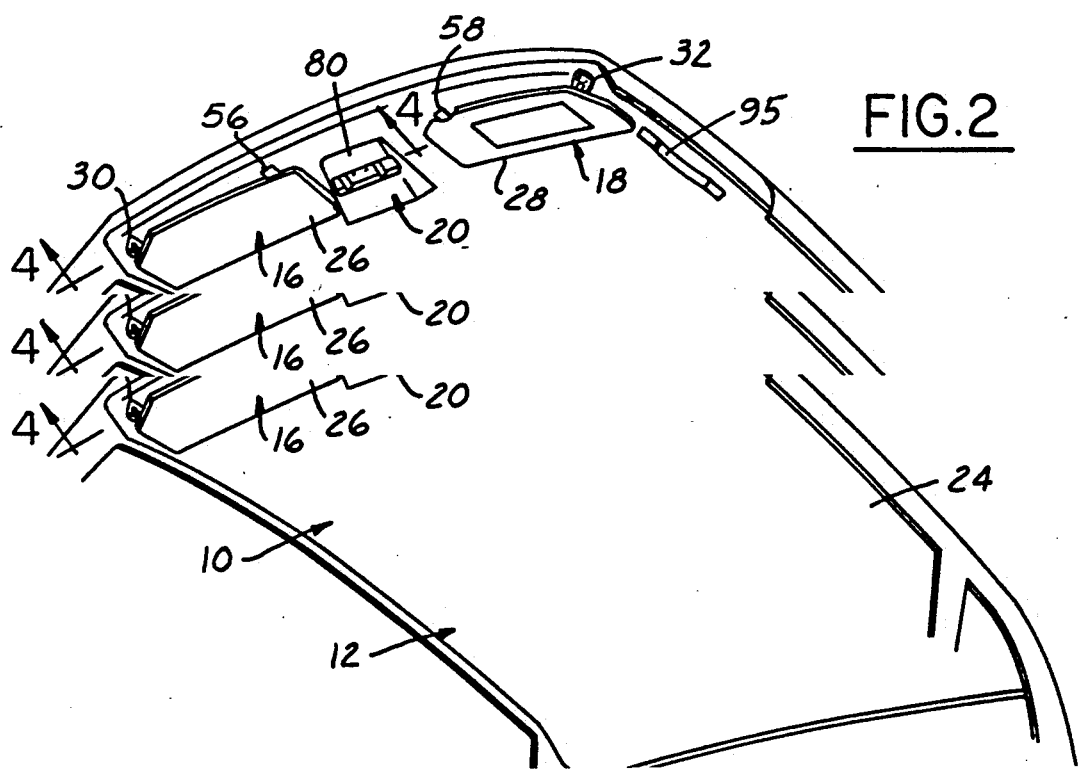
FIG. 2 is a perspective view of an installed headliner and accessory components as seen from the inside of the vehicle.
Figure 3:
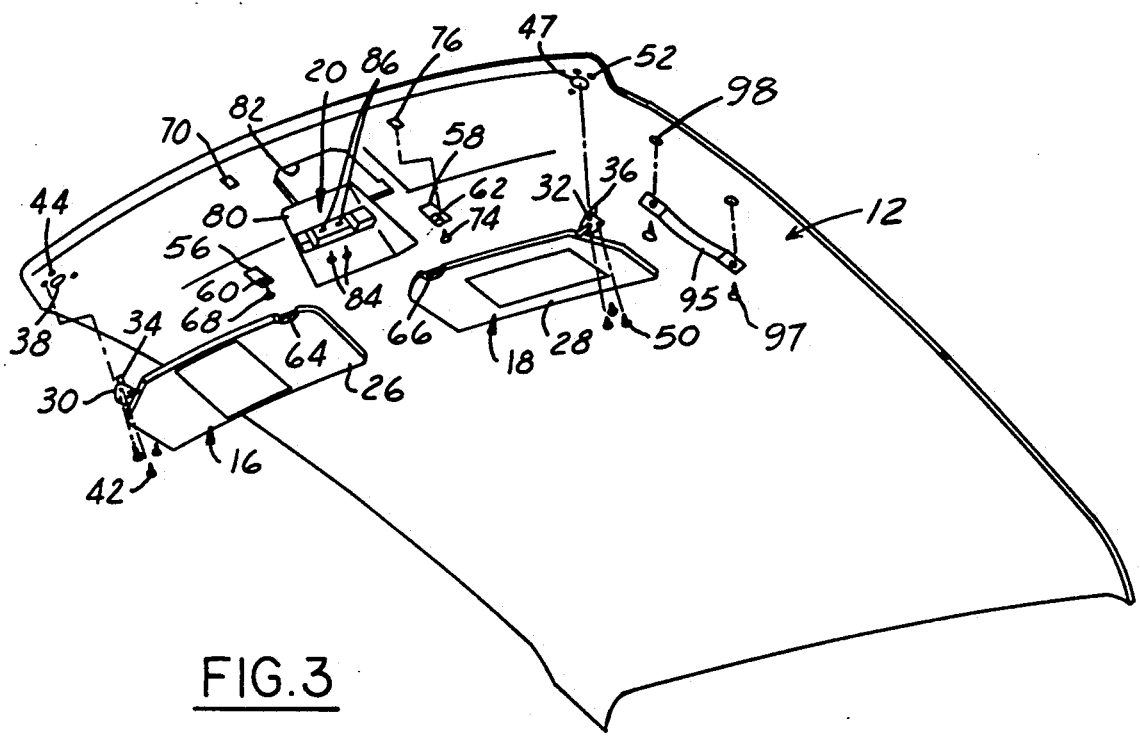
FIG. 3 an exploded view of the headliner and accessory components, as seen from the finish side.
Figure 4:
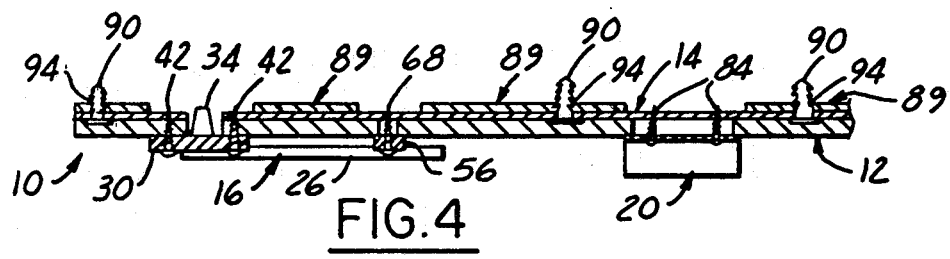
FIG. 4 is a sectional view taken on the line 4—4 in FIG. 2.
Figure 5:
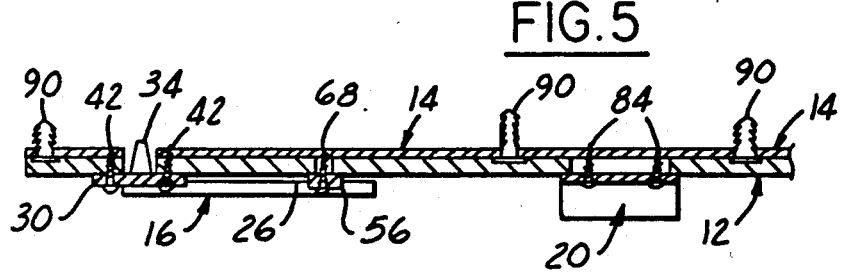
FIG. 5 is a sectional view similar to FIG. 4, but showing the headliner and retainer bar assembly detached from the roof of the vehicle.

Referring now more particularly to the drawings, the headliner and retainer assembly is generally designed by the numeral 10 and comprises a headliner panel 12, a retainer 14, and accessory components including visors 16 and 18, and a storage compartment and lighting unit 20. Other or additional accessory components may also be provided.

The headliner panel 12 may be made of any suitable material such, for example, as plastic or plastic foam, compressed wood or glass fibers, and sometimes includes a decorative cover layer. It is usually flexible and self-supporting, and of a generally rectangular configuration dimensioned and contoured to fit within and conform to the roof of the vehicle.

The retainer 14 is an elongated bar made of any suitable substantially rigid material such as sheet metal, plastic, etc. It extends along the full width of the front edge portion of the headliner panel 12, on the top side 23 thereof, that is on the side which faces the roof of the vehicle when the headliner is installed.

The visors 16 and 18 are on the bottom (finish) side 24 of the headliner panel near the front edge. The visors 16 and 18 comprise generally rectangular sun shades 26 and 28 at the driver and passenger sides, respectively, with mounting brackets 30 and 32 at the outer corners of the pivoted edge thereof. The sun shades are pivoted to the brackets by pivot posts 34 and 36.

The pivot post 34 for sun shade 26 extends through aligned openings 38 and 40 in the headliner panel 12 and retainer bar 14. The bracket 30 is secured to the retainer bar by screws 42 which extend through openings 44 in the headliner panel and thread into openings 46 in the retainer bar 14.

The pivot post 36 for sun shade 28 extends through aligned openings 47 and 48 in the headliner panel 12 and retainer bar 14. The bracket 32 is secured to the retainer bar by screws 50 which extend through openings 52 in the headliner panel and thread into openings 54 in the retainer bar 14.

The visors 16 and 18 have clips 56 and 58 provided with hooks 60 and 62 for engaging pins 64 and 66 near the inner corners of the pivoted edge of the sun shades 26 and 28. Clip 56 is secured to the retainer bar 14 by a screw 68 extending through an opening 70 in the headliner panel 12 and threaded into a hole 72 in the retainer bar. Clip 58 is secured to the retainer bar 14 by a screw 74 extending through an opening 76 in the headliner panel 12 and threaded into a hole 78 in the retainer bar.

The storage compartment and lighting unit 20 has a housing 80 near the front edge of the headliner panel midway between the side edges thereof. An opening 82 in the headliner panel 12 which the housing 80 covers, may be provided to clear electrical wiring to the housing. The housing is secured to the retainer bar 14 by screws 84 which extend through openings 86 in housing 80 and through opening 82 in the headliner panel 12 and thread into holes 88 in the retainer bar.

It will be seen that the accessory components on the bottom or finish side of the headliner panel 12 are attached to the retainer bar 14 on the top side of the headliner panel. The accessory components may be attached to the retainer bar by any suitable fastening means, but in this instance ordinary screws 42, 50, 68, 74 and 84 are employed. A sandwich assembly is thus created with the headliner panel in the middle. This assembly is attached to the metal upper vehicle body or roof frame structure 89 by fasteners 90 which extend through holes 92 in the ends and in the mid-portion of the retainer bar 14 into holes 94 in the roof frame structure. The fasteners 90 are inserted in the holes 92 of the retainer bar 14 before the accessory components are secured to the retainer bar so that the fasteners 90 are included in the sandwich assembly. The heads of fasteners 90 are flat and do not show through to the finish side of the headliner panel. The fasteners 90 are preferably of the push button type which are installed by being pushed into the designated attaching holes and then strongly resist being pulled back out. The well known Christmas tree type fasteners are shown at 90 and are extremely well suited for the purpose.

The sandwich assembly consisting of the retainer bar, headliner panel and accessory components, together with fasteners 90, can be brought into the vehicle through the windshield area and installed by aligning the holes 92 in the retainer bar with the holes 94 in the roof frame structure and pushing the fasteners 90 into the aligned holes with hand pressure only.

Each accessory component may be removed separately and even the headliner panel may be removed while the retainer bar remains permanently attached. Replacement parts may be added or replaced while the retainer bar is still attached to the vehicle body.

Obviously other accessory components besides visors and the storage compartment and lighting unit may be attached to the retainer bar through the headliner panel, if desired. Additional components may also be employed which are not attached to the retainer bar. As one example, an assist strap 95 on the bottom or finish side of the headliner may be secured to a separate retainer member 96 on the top side of the headliner panel by screws 97 extending through holes 98 in the headliner panel and threading into holes 99 in the retainer member 96.

The rear portion of the headliner panel 12 may be secured directly to the roof frame structure of the vehicle by any suitable means, such, for example, as adhesive or Velcro strips 100. The side edges may be retained by overlying molding strips (not shown) secured to the roof frame structure.

What is claimed is:

1. A headliner and retainer assembly adapted to be installed in a vehicle adjacent the roof thereof, said assembly comprising a headliner panel, headliner accessory components, and an elongated retainer bar, said retainer bar extending along one edge portion of said headliner panel on the side thereof which, when said assembly is installed, faces the roof of the vehicle, said components being disposed on the opposite side of said headliner panel and secured to said retainer bar by fasteners extending through said headliner panel to provide a sandwich assembly which is capable of being installed as a unit in the vehicle, and means for securing said retainer bar to the roof structure of the vehicle.

2. A headliner and retainer assembly as defined in claim 1, wherein said means for securing said retainer bar to the roof structure of the vehicle comprises push fasteners of the type which resist withdrawal after insertion in a hole.

3. A headliner and retainer assembly as defined in claim 1, wherein said retainer bar extends along the front edge portion of said headliner panel.

4. A headliner and retainer assembly as defined in claim 1, including an additional component on said opposite side of said headliner panel, a retainer member on the first-mentioned side of said headliner panel, and fastener means extending through said headliner panel and securing said additional component to said retainer member.

5. A headliner and liner assembly as defined in claim 1, wherein said retainer bar extends along the front edge portion of said headliner panel for substantially the full width thereof, and said means for securing said retainer bar to the roof structure of the vehicle comprises push fasteners of the type which resist withdrawal after inserting in a hole.

6. A headliner and retainer assembly as defined in claim 5, including an additional component on said opposite side of said headliner panel, a retainer member on the first-mentioned side of said headliner panel, and fastener means extending through said headliner panel and securing said additional component to said retainer member.

7. A liner and retainer assembly as defined in claim 2, wherein said securing means includes fasteners having heads which are covered and concealed by said liner panel when said liner panel is viewed from said opposite side thereof.

8. A headliner and retainer assembly adapted to be installed in a vehicle adjacent the roof thereof, said assembly comprising a headliner panel, headliner accessory components, and a retainer, said retainer being disposed on the side of said headliner panel which, when said assembly is installed, faces the roof of the vehicle, said components being disposed on the opposite side of said headliner panel and secured to said retainer by fasteners extending through said headliner panel to provide a sandwich assembly which is capable of being installed as a unit in the vehicle, and means for securing said retainer to the roof structure of the vehicle.

9. A liner and retainer assembly adapted to be installed in a vehicle, said assembly comprising a liner panel, liner accessory components, and accessory retainer means, said retainer means being disposed on the side of said liner panel which, when said assembly is installed in the vehicle, faces the frame structure of the vehicle, said accessory components being disposed on the opposite side of said liner panel, and fasteners for securing together said linear panel, accessory components, and retainer means in a sandwich assembly capable of being installed as a unit in the vehicle and for mounting said sandwich assembly to the frame structure of the vehicle with the side of said liner panel on which said retainer means is disposed facing said frame structure.

* * * * *